June 27, 1939. C. D. LAKE Re. 21,133

PERFORATING MACHINE

Original Filed Aug. 9, 1933 7 Sheets-Sheet 1

INVENTOR
Clair D. Lake
BY
W. M. Wilson
ATTORNEY

June 27, 1939. C. D. LAKE Re. 21,133

PERFORATING MACHINE

Original Filed Aug. 9, 1933 7 Sheets-Sheet 2

INVENTOR
Clair D. Lake
BY
W. Millison
ATTORNEY

June 27, 1939. C. D. LAKE Re. 21,133

PERFORATING MACHINE

Original Filed Aug. 9, 1933 7 Sheets-Sheet 3

INVENTOR
Clair D. Lake
BY
W. M. Wilson
ATTORNEY

PERFORATING MACHINE

Original Filed Aug. 9, 1933 7 Sheets-Sheet 4

INVENTOR
Clair D. Lake
BY
W. Mirkson
ATTORNEY

INVENTOR
Clair D. Lake
BY
W. M. Wilson
ATTORNEY

June 27, 1939. C. D. LAKE Re. 21,133

PERFORATING MACHINE

Original Filed Aug. 9, 1933 7 Sheets-Sheet 6

INVENTOR
Clair D. Lake
BY
W. M. Wilson
ATTORNEY

June 27, 1939. C. D. LAKE Re. 21,133

PERFORATING MACHINE

Original Filed Aug. 9, 1933 7 Sheets-Sheet 7

INVENTOR
Clair D. Lake
BY
W. M. Wilson
ATTORNEY

Reissued June 27, 1939

Re. 21,133

UNITED STATES PATENT OFFICE 21,133

PERFORATING MACHINE

Clair D. Lake, Binghamton, N. Y., assignor to International Business Machines Corporation, New York, N. Y., a corporation of New York Original No. 2,032,805, dated March 3, 1936, Serial No. 685,379, August 9, 1933. Application for reissue September 21, 1937, Serial No. 164,882

35 Claims. (Cl. 164—115)

This invention relates to devices for perforating record cards. More specifically the invention is concerned with improved devices for reproducing and gang punching record cards under control of other perforated cards.

An object of the invention is to provide card feeding and punching devices capable of operation at high speed for reproducing and gang punching perforated record cards. The punches are arranged in a single line across the length of the record card so that only twelve steps of movement are needed to completely punch a card, regardless of the columnar capacity. A Geneva drive gear feeds the cards with intermittent and gradually accelerated movement.

Another object of the invention is to devise class selection devices for control of the punching devices so that data of a certain class on the original cards may be punched in a different field or eliminated in transferring the data to the blank cards. The classification of the data on the original or master cards is denoted by the presence or absence of a special perforation. The special perforation in an original card may also control selective punching in fields not receiving master or pattern card data but adapted to receive fixed data controlled by timed cam contacts which are closed as a certain index point on the blank card passes the punches. The special perforation controls operation of connections between the contacts and punches. Thus, one or more zero perforations or other index point perforations may be selectively punched in any column or columns of a blank card under control of timed contacts and a special class selection perforation in an original card.

Another object of the invention is to provide devices for checking or verifying the perforations in the punched cards to make sure that they agree with the data on the original record cards. If there is a disagreement in the perforations, the machine stops and a light flashes to indicate the error to the operator of the machine.

When the machine is conditioned for reproducing, the record cards are fed in synchronism from two feed hoppers. An interlock prevents starting of the machine until cards are in both hoppers. The one hopper contains the pattern or original cards which are already perforated and the other hopper holds the blank cards which are to be perforated to correspond to the original cards. As they are fed from the hoppers, a pattern card and an associated blank card are simultaneously placed in related feeding rollers and then moved along concurrently and in synchronism, the blank card having an intermittent movement. The pattern card passes a sensing station and the blank card passes a punching station. The cards are of the regular Hollerith form and are fed laterally across the short width with the twelve index point position leading so that if a class selection or other control function is to be exercised by a special hole in the eleven or twelve position, the punching may be controlled as it follows thereafter. The blank cards pause momentarily at each index point position so that if a perforation is to be reproduced, the punch has time to penetrate and withdraw from the punched card. The intermittent motion of the card is brought about by the use of a Geneva step motion gearing connected to the card feeding rollers.

The blank card is drawn under a single line of punches, there being one punch for each column of index points on the card, the card moving to bring the various digit index positions successively under the punches. At the same time that the blank card is passing under the single line of punches, the pattern card is passing over a single line of sensing brushes. Each sensing brush is connected to a magnet for controlling a related punch.

The pattern card is sensed at each line of index points and if a perforation appears, a circuit is established through one of the punch control magnets the armature of which is connected by a call wire to an interposer pawl articulated on the end of a punch plunger. The pawl has a shoulder normally out of the path of a positive actuator which is reciprocated as each index point is sensed. If the pawl is selected, it tends to engage the actuator and does so when the actuator lowers out of the way of a cam face on the pawl. Another cam face on the pawl cooperates with a stationary bar to hold the pawl positively into engagement with the actuator during the punching and retracting movement.

The first line of index points sensed on the pattern card may contain a special perforation to exercise the special controls of class selection, class elimination or field selection of the data to be reproduced. For example, in class selection, data on one field of the pattern card may be directed to either of two fields on the blank card according to the classification of the data. The classification is denoted by the presence of the special hole which controls the shifting of contacts to change the direction of data to another field on the blank card. In class elimination, data on the pattern card may be directed to the blank card by closed contacts or eliminated by opening said contacts according to the classification of the data. The presence of a special perforation may serve to open or close such class elimination contacts. In field selection, data on either of two fields on the pattern card may be selected and directed to one field on the blank card according to the classification of the data.

The punched cards may be checked or verified to make sure they agree with the pattern. For this purpose, the pattern and punched cards enter checking sensing stations after passing through the respective sensing and punching stations. The cards are fed in synchronism with line after line of index points passing over the two lines of checking sensing brushes. When perforations fail to coincide, the machine is stopped and a light indicates the error to the operator. The class selected data may also be checked.

The punching and checking stations through which the blank cards pass may be used for gang punching. A perforated master card is placed at the bottom of the hopper beneath a bunch of blank cards which are to receive the data on the master card. Then the master card is fed under the punch and over to the sensing station. The first blank card following the master card is fed under the line of punches as the master card moves in synchronism over the sensing brushes. The punches are operated under control of the sensing brushes to punch the blank card as a duplicate of the master card. This operation continues as the following cards feed, the cards being punched successively to correspond with the preceding card.

A number of master cards may be interspersed between the blank cards for successive gang punching operations of more than one group of cards. For such use the master card has a special perforation which controls devices for disabling punching between groups while the incoming master card passes under the punches and over to the sensing brushes.

The field selection controls described hereinafter as applied during reproducing may also be effected during gang punching. Then a special perforation in the master card directs the perforated data in a selected field on the master card to the proper field on the following gang punched cards.

The machine may be conditioned for combined gang punching and reproducing control. Then the blank cards are adapted to be perforated with data from two sources, the master card which precedes them and the pattern cards which accompany them. Several groups may be gang punched with continuous feeding without stopping when encountering each interspersed master card. This is possible because when a master card is encountered at the front of the punching station, control is exercised by a special perforation therein to hold up the feeding of the pattern cards for one cycle to allow the master card to proceed to the sensing station before combined punching is continued. During operation under combined control, checking may be done on the reproduced portion of the perforated records.

The special perforations in the pattern and master cards may be reproduced, transferred or eliminated in the control of punching record cards. Regular data perforations may appear in the same column with the special perforation on a pattern or master card, and these perforations may also be selectively reproduced, separately transferred or eliminated. Connected with the devices sensing the column containing the special perforation are contacts which close one line and open another as the sensing means passes from the two special index positions to the regular numeral data positions on the record cards. These lines may be connected to any column position in the punch or disconnected therefrom.

Another feature of the invention is the checking of the class selected perforations in the record cards. Even though the record cards may be perforated in either of two fields under control of a single field on the pattern cards, the checking devices are adapted to switch the connection to the sensing brushes cooperating with the proper perforated field and thereby check the class selected perforations with the original perforations in the pattern card.

Another improvement is in the means for stopping the machine when card feeding fails in either hopper, and the automatic selective operation of feeding only in that hopper, on depression of a start key, until a card is fed.

These and other objects of the invention will be noted as the specification continues with reference to the drawings which accompany and form part of the specification.

Figure 10A:
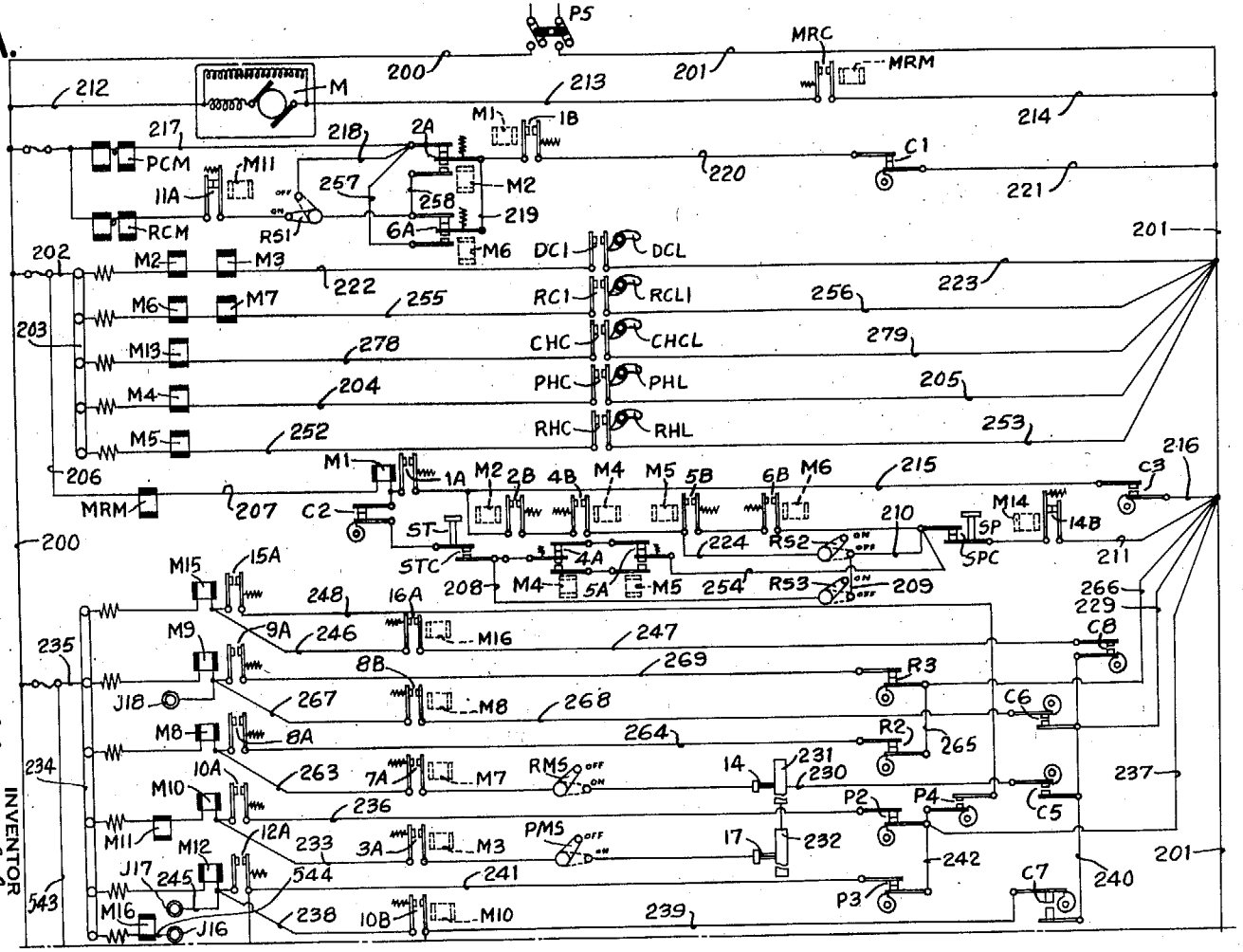
Figure 10B:
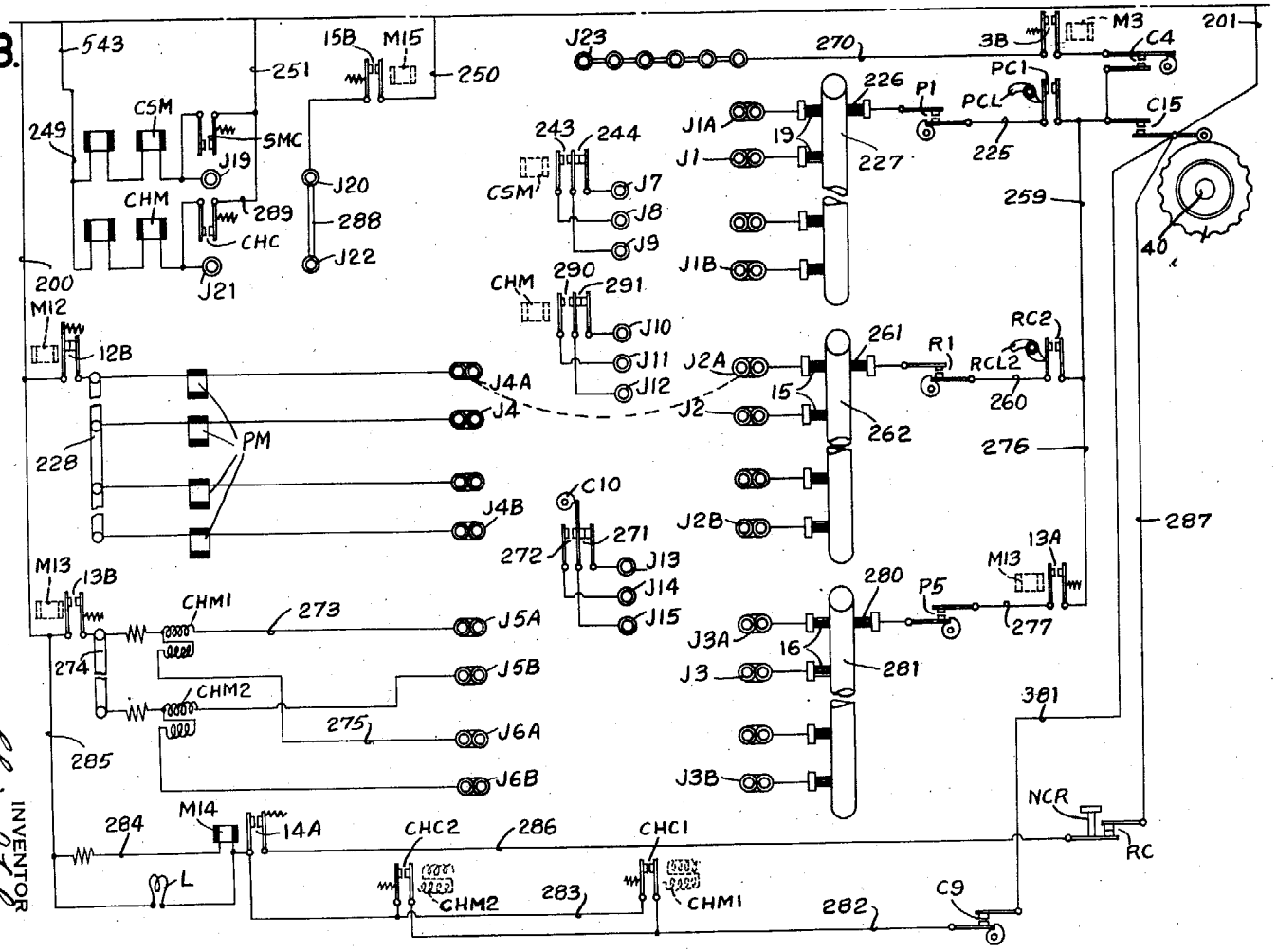

Figs. 10A and 10B taken together form a wiring diagram of the machine.

Figures 1, 2:
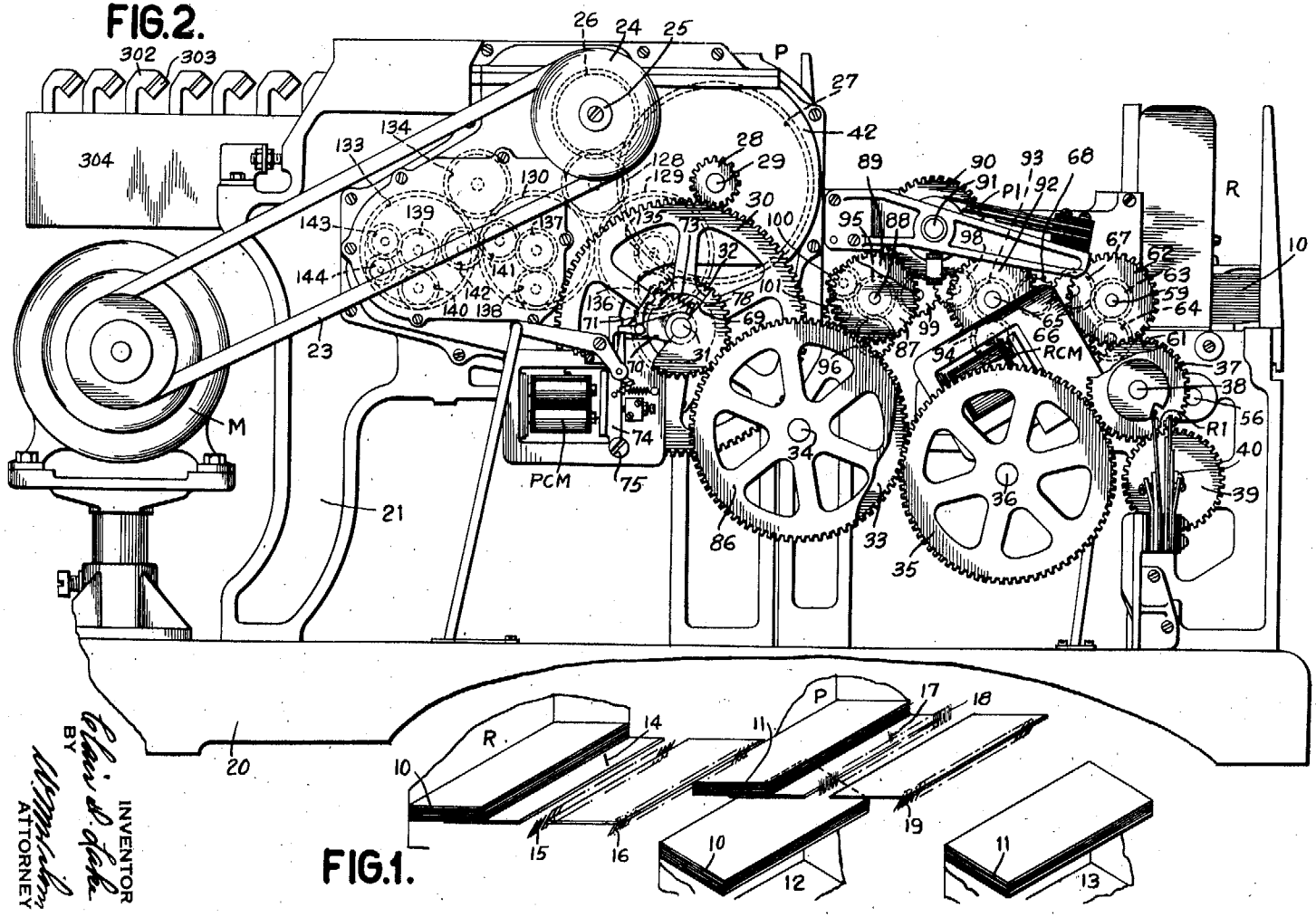
Fig. 1 is a diagrammatic view showing the arrangement of sensing, punching and checking stations, and the card hoppers and stackers of the machine.
Fig. 2 is a side elevation view of the machine.

A general idea of the operation of the devices of the present invention may be gathered by observing the diagrammatic view shown in Fig. 1. There it is noted that there are a number of pattern cards 10 in the hopper R and another bunch of blank record cards 11 in the hopper P. The cards are fed singly but concurrently from both hoppers and are then shifted in synchronism across sensing and punching stations before being deposited in stackers 12 and 13.

The pattern card 10 encounters first a master sensing brush 14, then a set or line of sensing brushes 15, and then a series of checking brushes 16. The record card 11 passes a master brush 17, then a line of punches 18 and then the set of checking brushes 19.

The brush 14 cooperates with a special perforation position on the original or pattern card 10 and when such a perforation is sensed a class selection operation may take place to shift the sensed data to a selected field on the record card. The brush 17 is used for field selection of gang punching and also for control of suspension of pattern card feeding when operating for combined gang punching and reproducing.

There are electrical connections between the brushes 15 and the punches 18, so that when a perforation is sensed in a pattern card 10 a corresponding perforation is punched in the related record card 11.

As the cards pass the first sensing and punching stations, they enter the checking sensing stations. The pattern card 10 is sensed by checking brushes 16 at the same time that the related record card 11 is sensed by checking brushes 19. If the perforations in both do not agree, the machine is stopped and a lamp lights to indicate the error to the operator.

When the machine is used for straight gang punching, only the section of the machine to the right of hopper P, Fig. 1, is used. A prepunched master card is placed at the bottom of the hopper P and fed from there under the punches 18 and over to the brushes 19. For gang punching, these checking brushes have a function other than checking. They have electrical connections to the punches 18, and when a perforation is sensed in a master card or a card 11 following thereafter, the next following blank card is perforated by punches 18 to duplicate the data on the preceding card. In this way an entire group of cards 11 is gang punched under control of the leading master card.

When it is desired to gang punch a plurality of groups of cards, a number of master cards are interspersed in the blank record cards 11 in hopper P. The operation that follows is substantially the same as with a single group, the only difference in operation occurring when an interspersed master card passes under the punches 18. Such a card should not be punched under control of the preceding card 11 which is at the end of the preceding group. For this purpose the separate brush 17 is adapted to sense master cards and prevent punching until the master card is over the sensing brushes 19.

For combined reproducing and gang punching operation both sections of the machine are used. The cards 11 are operated upon as described hereinbefore, the only difference being that a number of the punches 18 are controlled by the pattern card 10 and brushes 15, while others of the punches 18 are controlled by the gang punching master card and brushes 19. When operating in this way, only certain of the brushes 16 and 19 may be used for checking the reproduced portion of the perforated data.

Figure 8:
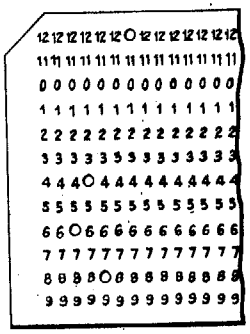
Fig. 8 is a detail view of a portion of a record card.

Fig. 8 shows a portion of a perforated card. Such a card may act as a pattern card or a master card. It is noted that the card is perforated with the number 648. It also contains a special perforation or R hole at the twelve position in the 7th column. Other special perforations known as X holes may be punched at the eleven index position in any column of the card.

There are usually 45 or 80 columns of index points on a card. In the present machine the card is sensed while being fed laterally in line with the column of index points. Therefore only twelve sensing operations are needed to completely sense a card instead of the forty-five or eighty sensing operations necessary when feeding the card in the longitudinal direction.

A plurality of the columns on the card may contain related data such as a name, number or date. Such a group of columns may be said to constitute a field of data on the card.

Although a Hollerith type card is shown with a single digit perforation in each column, it may be pointed out that the machine is capable of operating to sense and punch combinational hole records wherein two or more perforations appear in a column. In other words, should five perforations appear in a single column on an original record, they would be reproduced or gang punched in the duplicate.

Where the terms "record card column" and "index points" appear in the claims, it will be understood that they mean that the record card is divided into parallel columns (as illustrated in Fig. 8) each column having nine or more different positions or index points. Each index point represents a different value by virtue of its location from a reference edge of the card, so that when a perforated card is analyzed by passing it through a tabulating machine in a columnar direction, or analyzed at rest, the index points will control associated representing devices. The term "record card column containing index points" is, therefore, defined as a card column containing a series of different index points having varying control functions by virtue of their differential locations in the column.

Turning now to driving connections of the machine, it is noted that in Fig. 2 a motor M is mounted above the base 20 of the machine which also carries a pair of main side frames 21 and 22. The motor is connected by a driving belt 23 to a pulley 24 on a shaft 25, Fig. 5, mounted on bearings in the frame 21 and in a gear cover 42, Fig. 7. Fixed to the shaft 25 is a gear 26 which serves to drive the continuously running devices of the machine.

Figure 9:
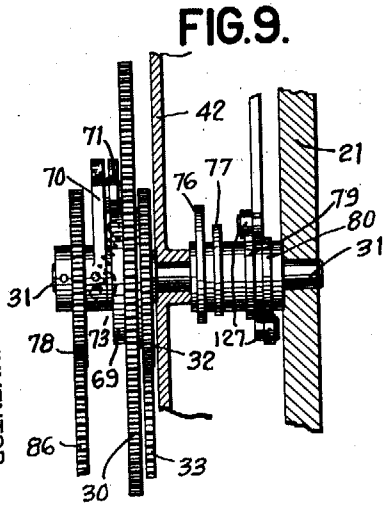
Fig. 9 is a detail view of the punch feed clutch shaft with the driving gears, the clutch and the complementary cams mounted thereon.

Speed reduction gearing is placed between the gear 26 and the card feeding mechanism. The gear 26, Fig. 5, meshes with a large gear 27 to which is attached a small gear 28, both being secured to a shaft 29 between frame 21 and a cover 42, Fig. 4. The small gear meshes with a large punch clutch driving gear 30, Figs. 2 and 9, which is pivoted on a punch feed drive shaft 31 and attached to another driving gear 32. Fig. 9 shows the mounting of the drive shaft 31 on bearings in frame 21 and in cover 42 secured to the frame.

Gear connections are provided between the punch clutch under the hopper P and another clutch under the hopper R, so that cards may be fed in synchronism from both hoppers. The gear 32, Fig. 2, meshes with another gear 33 pivoted at 34. This gear 33 in turn meshes with a similar gear 35 pivoted at 36. Gear 35 meshes with a reproducer clutch driving gear 37 on shaft 38.

The gear 37 drives a gear 39 attached to a shaft 40. Thus this shaft is given a continuous movement. It is used as a mounting for a number of cams cooperating with the cam contacts C1—C10, mentioned hereinafter, and also as a mounting for an impulse distributor wheel 41 shown in Fig. 10B as an actuator for contacts C15.

Figure 3:
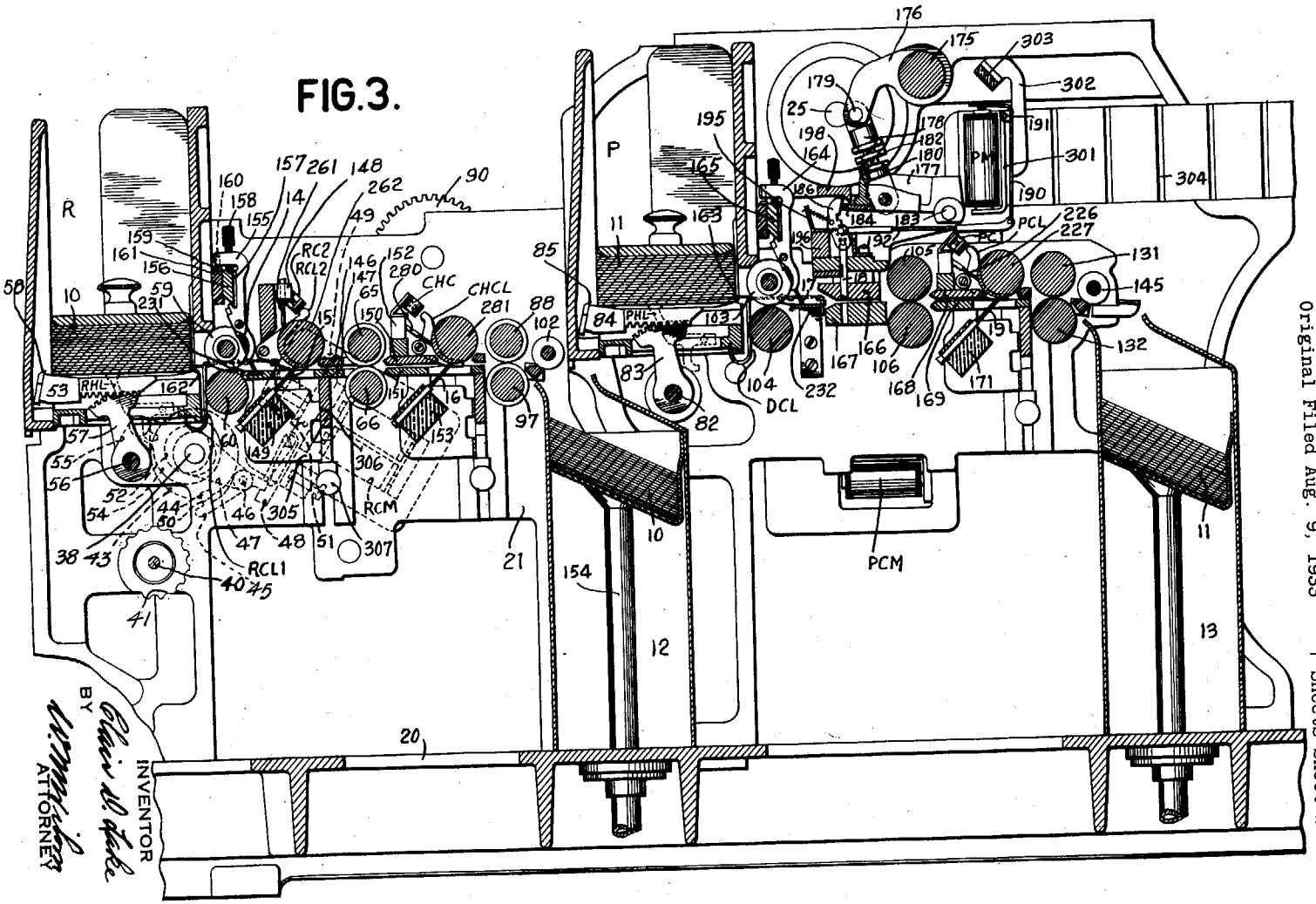
Fig. 3 is a sectional elevation view of the machine showing the feeding, sensing and perforating devices. The view is taken substantially along the lines 3—3 of Fig. 4 looking in the direction of the arrows.
Figure 4:
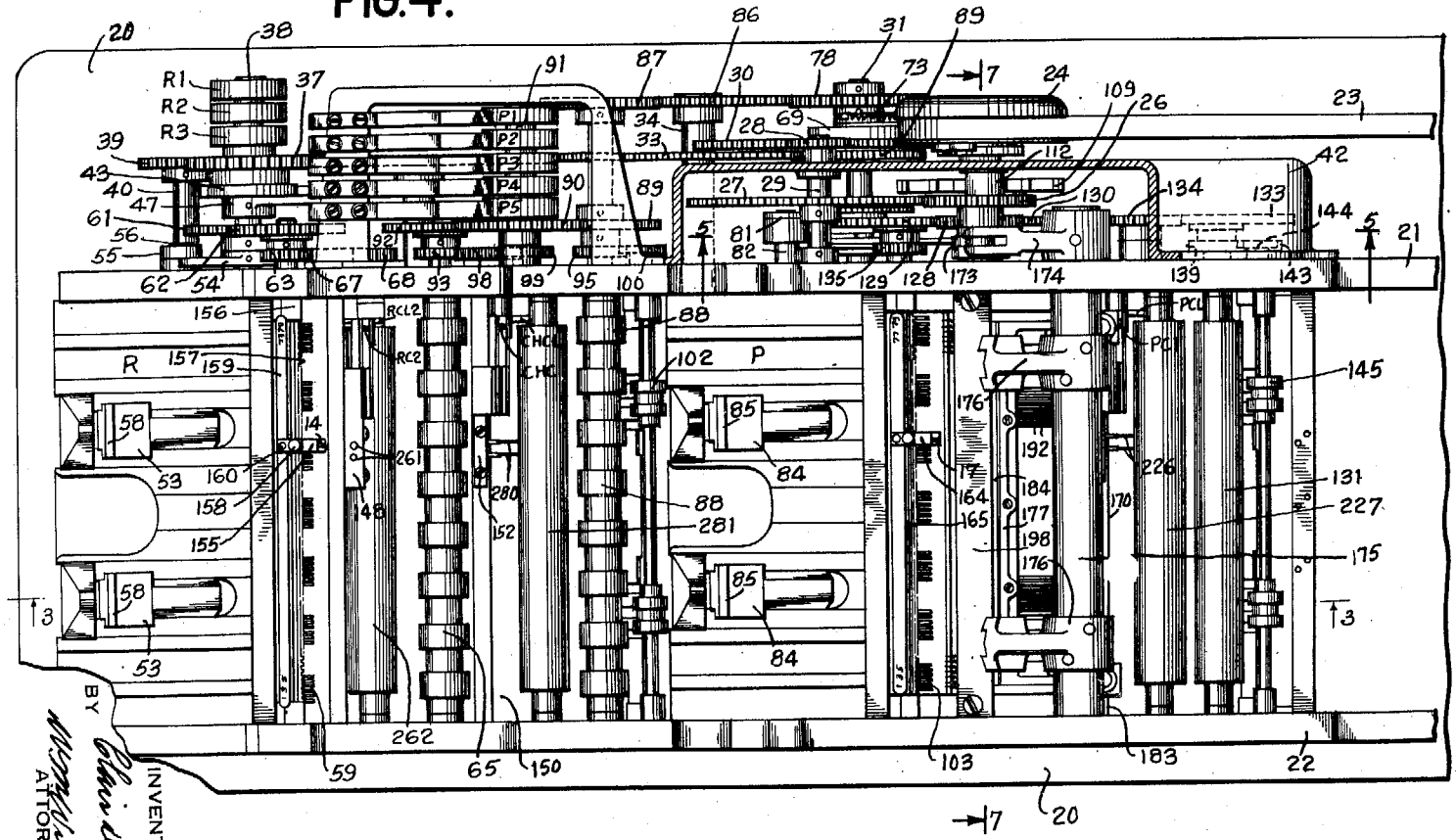
Fig. 4 is a plan view of the machine.

Attached to the gear 37 is a clutch disk 43 Figs. 3 and 4, with a notch 44. Cooperating with the notch is a pawl 45 mounted at 46 on an arm 47 attached to shaft 38. One end of the pawl is engaged by an armature latch 48 pivoted at 49 and the other end of the pawl is formed with an extension 50 adapted to fall into notch 44. A spring 51 normally holds the armature latch 48 into engagement with pawl 45, but when the associated magnet RCM is energized, the latch is moved away from the pawl, which then connects the shaft 38 to the driving gear 37.

The shaft 38 is provided with an eccentric 52 for operating card feed picker slides 53. Encircling the eccentric is a strap 54 which receives a reciprocating motion for each rotation of shaft 38. The strap 54 is formed with an ear pivotally attached to an arm 55 attached to a shaft 56 which also carries a pair of gear sectors 57. The sectors mesh with teeth on the bottom of picker slides 53 forming a driving connection therewith. The slides carry a projecting picker knife 58 which is adapted to engage the bottom card in the hopper.

It is apparent from the described connections in the reproducer clutch that when the magnet RCM is energized the picker knife 58 is moved to the right, Fig. 3, bringing the bottom pattern card 10 in the hopper R over into cooperation with feeding rollers 59 and 60. There is such a feeding action for each cycle of operation when reproducing.

The feeding rollers 59 and 60 are driven by a gear 61, Figs. 2 and 4, on shaft 38 in mesh with a gear 62 on roller 59. A smaller gear 63 on roller 59 cooperates with a similar gear 64 on roller 60 so that both rollers are turned simultaneously but oppositely. The rollers extend across the machine between the side frames. The roller 59 is slotted at various column positions to permit the proper placement of the master brush 14 in any position. When turning they draw a card from the hopper and feed it to the right, Fig. 3, between the brushes 14 and 15, and over into other feeding rollers 65 and 66 the driving of which is described hereinafter.

The contact roller 262 associated with brushes 15 is driven by gear connections from feed roller 59. The gear 63 on roller 59 meshes with an idler gear 67 which in turn meshes with a gear 68 on contact roller 262.

The punch clutch under hopper P is operated when connections are established between shaft 31, Figs. 2, 3 and 9, and the driving gear 30. Attached to gears 30 and 32 is a notched disk 69, Fig. 9, loose on shaft 31. Adjacent the disk is an arm 70 secured to shaft 31 and carrying a clutch pawl 71 pivoted thereon. The pawl has an extension adapted to fit into the notch in disk 69 and is urged to engage the disk by a spring 73. However, the pawl is held disengaged by an armature latch 74, Fig. 2, which engages an extending arm on the pawl. When the punch clutch magnet PCM is energized, the associated armature is attracted and latch 74 is rocked to the left, Fig. 2, about pivot 75, releasing pawl 71 and connecting shaft 31 to the driving gears.

When the shaft 31 is operated, three driving devices carried thereon are made effective to actuate various card feeding means. A pair of complementary cams 76, 77, Fig. 9, serve to drive the card picker mechanism. A gear 78 drives the checking station feed rollers, and another set of complementary cams 79 and 80 act to release a clutch connection in the Geneva gear drive.

Figure 5:
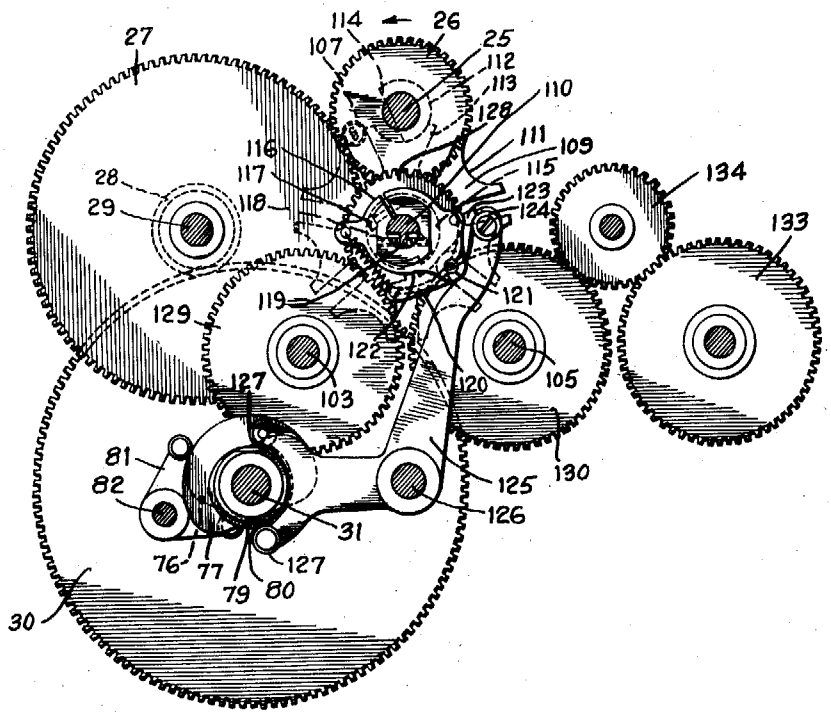
Fig. 5 is a sectional elevation view taken along line 5—5 in Fig. 4 and showing a portion of the driving mechanism including the Geneva step motion gear.

A two armed lever 81, Figs. 4 and 5, on shaft 82 carries a pair of rollers cooperating with the related cams 76 and 77. Also attached to the shaft 82 are sector arms 83, Fig. 3, with gear teeth that mesh with racks on the picker slides 84. A knife edge 85 attached to the slide is adapted to engage the bottom card in hopper P and move the card to the right, Fig. 3, when the picker slide 83 is reciprocated by the cams 76, 77 on shaft 31.

The card feed rollers on the sides of checking brushes 16, Fig. 3, are actuated by gear 78, Figs. 2 and 9, each time the punch clutch is operated. The gear 78, Fig. 2, meshes with a gear 86 which is mounted on the same stud 34 with gear 33. Gear 86 meshes with a gear 87 attached to the feed roller 88. Another gear 89 on feed roller 88 meshes with a gear 90 attached to the shaft 91 which carries the cams for operating the cam contacts P1—P2. Gear 90 meshes with a gear 92 attached to the feed roller 65 which also carries a small gear 93 in mesh with a similar gear 94 on the associated roller 66. A small gear 95 on roller 88 drives a similar gear 96 on the associated roller 97. An idler gear 98 meshes with gear 93 and drives the contact roller 281 through a gear 99 mounted thereon. Another idler gear 100 meshes with gear 95 and serves to drive a pinion 101 mounted on a card deflecting eject roller 102.

There are connections from the driving gear 26, Fig. 2, to the punch feeding rollers 103, 104, 105, and 106, Fig. 3, for feeding cards under the punch plungers 18. A roller 107, Figs. 5 and 7, on a stud extending from the gear 26, forms a means for driving a Geneva step motion gear 109 with an intermittent movement.

The stud is adjustably mounted in a slot in gear 26. The notched gear wheel 109 turns on a short stud 110 adapted to rotate in frame 21, but is locked in each position by the cooperation of a concentric formation 111 at the end of each radial extension with a hub 112 on shaft 25. The roller 107 moves idly for the greater part of the arc about shaft 25 in a counterclockwise direction, Fig. 5, until it engages in one of the slots 113 in gear 109. The gear is moved with a gradually accelerated and then gradually retarded motion which is stopped as the roller slips out of the slot. The gear is released for each step of movement by a depression 114 in the side of the hub 112. The depression is presented only when the roller 107 is in position to drive the gear.

Figure 7:
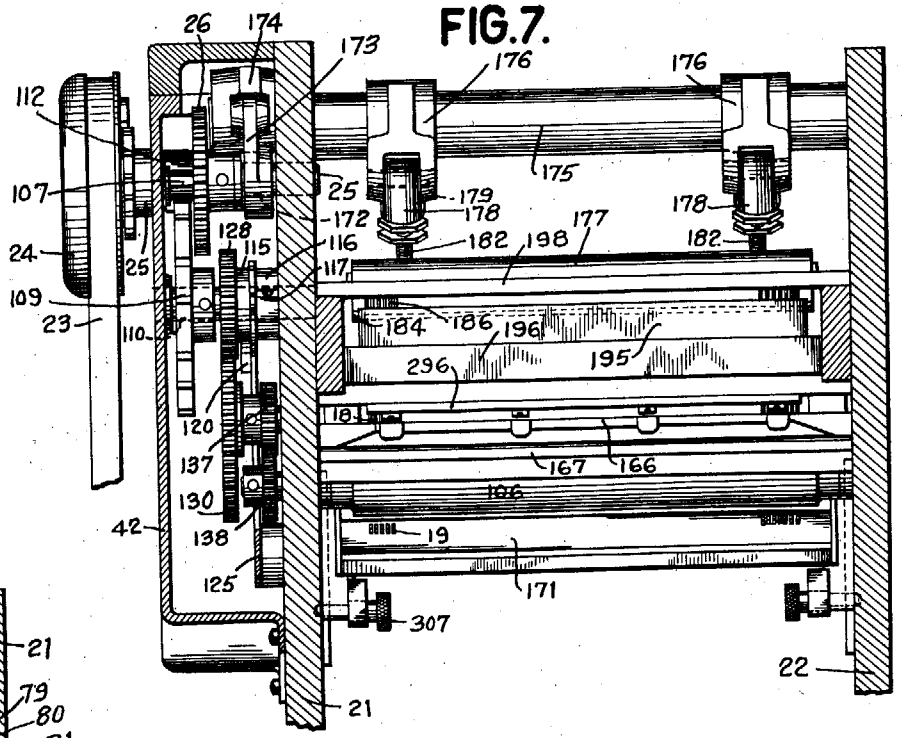
Fig. 7 is an elevation view of a line of punches and the associated driving mechanism.

A clutch connection is provided between the Geneva gear wheel 109 and the feed rollers so that feeding may be prevented when cards are not to be punched. In Figs. 5 and 7 it is shown that a notched disk 115 is loose on the stud 110 carrying wheel 109. Adjacent the disk is a plate 116 which is split at one side where it is clamped to the stud 110 by a screw 117. The plate is adjustably positioned on the shaft by a pair of set screws 118 which are threaded in the plate and extend into cooperation with a tongue 119 cut in the shaft. A clutch pawl 120 is pivoted at 121 on the plate 116. The pawl is spring urged to bring an extension 122 thereon into cooperation with the notch in disk 115. An extending arm 123 on the pawl 120 cooperates with a roller 124 on the end of a lever 125 pivoted on stud 126. The horizontal portion of lever 125 carries a pair of rollers 127 which cooperate with the complementary cams 79 and 80, Fig. 9, already mentioned. The cams are designed so that if the magnet PCM is not energized and the shaft 31 is not moved, lever 125 is positioned with roller 124 holding pawl 120 out of cooperation with the driving disk 115.

However, should the magnet PCM be energized, the cams 79 and 80 are turned, lever 125 is rocked permitting the engagement of pawl 120 with disk 115, and establishing a driving connection between the Geneva wheel 109 and a gear 128 attached to the disk 115.

The gear 128, Figs. 2 and 5, meshes with two gears 129 and 130 on feeding rollers 103 and 105, Fig. 3, respectively. An idler gear 134, Fig. 2, between gear 130 and another gear 133 forms the driving connections over to the feed roller 131, Fig. 3, on which gear 133, Fig. 2, is attached. A small gear 135 on roller 103 cooperates with a similar gear 136 on roller 104. The same sort of gear connection is made between gears 137 and 138 on rollers 105 and 106, and between gears 139 and 140 on rollers 131 and 132, respectively.

An idler gear 141 connects gear 137 to a gear 142 on the contact roller 227, Fig. 3. Another idler gear 143, Fig. 2, meshes between gear 139 and a pinion 144 attached to a card deflecting reject roller 145, Fig. 3.

The operation of the various card sensing devices may be described in conjunction with tracing the course of a card through the feed rollers. When a group of pattern cards 10, Fig. 3, are placed in the hopper R, the bottom card depresses the hopper contact lever RHL closing the associated contacts RHC, Fig. 10A. Then, when the picker is operated, the bottom card alone is pushed through the throat 162 and placed between feed rollers 59 and 60 which feed the card along between guide plates 146, 147.

As the card enters the sensing station a card lever RCL1 is operated. At the same time the card passes between the reproducer master card brush 14 and the contact plate 231. From there the card passes between the brushes 15 and the contact roller 262 and at the same time operates a card lever RCL2. Common contact brushes 261 mounted in an insulation block 148 carry the sensing current to the roller 262. The plurality of sensing brushes 15 are arranged in a single line and held in an insulation bar 149 which is supported on a pair of frames 305 fixed to a rigid bar 306. This bar is removable and carries therewith the entire sensing station comprising brushes 15, plate 147 and frames 305. The unit is slipped up into place between the main frames and fastened with thumb screws 307. The sensing units carrying brushes 16 and 19 are constructed in a similar fashion.

The card passes on to the feed rollers 65, 66 which feed it between the guide plates 150 and 151. A card lever CHCL is operated as the card passes between checking brushes 16 and contact roller 281. An insulation block 152 holds a pair of common contact brushes 280 which contacts the roller 281. An insulation bar 153 secured between the side frames holds the line of brushes 16. A short distance from the brushes 16, the card is engaged by the rollers 88 and 97 which eject it. As the card is ejected it is deflected by the roller 102 so that it is directed into the stacker 12 where the cards are supported on the top of a depressible spring plunger 154 slidably mounted in base 20.

The master brush 14 mentioned hereinbefore is adjustable along the length of the card sensing position to cooperate with any column on the card. A holding frame 155, Figs. 3 and 4, carries the brush 14 and secures it in any position along a supporting bar 156 which is cut with a number of slots 157 coinciding with the various column sensing positions. The frame 155 is adapted to be keyed in any slot and held there when a screw 158 on the frame is tightened against the bar 156, wedging the lower end of the frame against the pointed end at the bottom of the bar. An indicating strip 159 on bar 156 is marked with numerals identifying the various column positions. A hole 160 in frame 155 coincides with one of the numerals when the frame is secured in the related column position. An insulation bar 161 secures the bar 156 to the rear side of the hopper R.

The blank record cards 11 and the master cards placed in hopper P follow a course through punching and sensing stations before being deposited in stacker 13. The cards in the hopper depress the hopper contact lever PHL and close the associated contacts PHC, Fig. 10A. Then, when the picker 85 is operated, the bottom card is pushed through the throat 163 and placed between feed rollers 103 and 104 which feed the card along between the punch master card brush 17 and contact bar 232. As the card passes it operates a card lever DCL. The brush 17 is attached to an adjustable frame 164 on a guide bar 165 similar to the frame 155 and bar 156 described hereinbefore.

After leaving the master card sensing station, the card is fed between a stripper plate 166 and a die plate 167 secured to the main side frames. Then the card enters between feed rollers 105 and 106 which feed it between guide plates 168 and 169 in the punch sensing station. A card lever PCL is operated as the card passes between sensing brushes 19 and contact roller 227. An insulation block 170 holds common contact brushes 226 into contact with the roller 227. A large insulation bar 171 secured between the side frames holds the line of sensing brushes 19 in contact with roller 227. When the card leaves the brushes 19 it is engaged by the rollers 131 and 132 which eject it. As the card is ejected it is deflected by the roller 145 so that it is directed into the card stacker 13.

Figure 6:
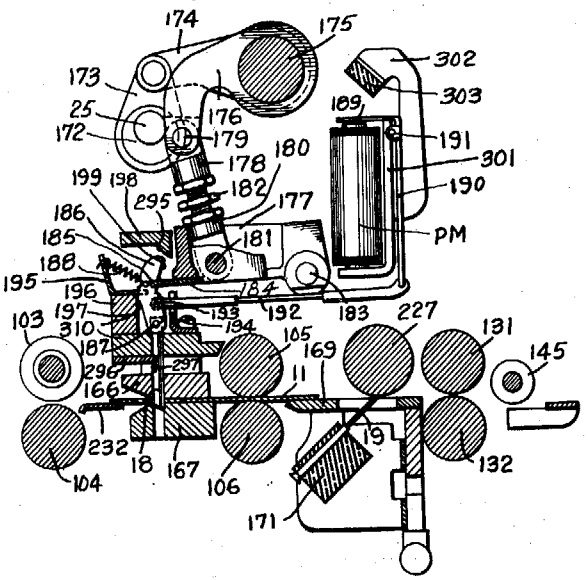
Fig. 6 is a sectional elevation view of the punch showing the plunger in a depressed position.

The selective operation of the punch plungers 18 may be explained with reference to Figs. 3, 4, 6, and 7. In Fig. 6 it is noted that the shaft 25 is formed with an eccentric 172 which is encircled by an arm 173. The upper end of this arm is pivotally connected to an arm 174 on shaft 175 which is provided with another pair of arms 176 intermediate the side frames. Between these arms 176 and a punch operating bail 177 there is provided an adjustable turn-buckle connection. A threaded rod 178 is pivoted at 179 on arm 176, and another rod 180 is pivoted at 181 on bail 177; both rods being connected by a double ended bolt 182 which is adjustable to vary the position of the bail.

The bail 177 is pivoted on studs 183 in the main side frames and carries a punch actuating bar 184 which is adapted to cooperate with notches 185 in any of a plurality of selected interposer pawls 186. Each of the punch plungers 18 has an interposer pawl 186 which is pivotally connected thereto by a pin 187. Normally the pawl is held out of the path of the bar 184 and the plunger is held above the die by a spring 188 attached to the pawl. However, when a magnet PM is energized, the associated pawl is drawn into cooperation with bar 184 and the related plunger is depressed to perforate the card.

The armature 189 of the punch controlling magnet PM is mounted on a lever 190 pivoted at 191. The lower end of lever 190 is pivotally connected to a call wire 192 the other end of which is pivoted at 193 on pawl 186. A plurality of such connections are made, one to each pawl, the magnets PM being arranged in staggered rows and columns. The brackets 301 carry the magnets of one row as a unit, and have arms 302 which hold an insulation bar 303 suspended above the magnets to act as a terminal bar. A number of such units may be dropped into the frame 304 and connected by call wires 192.

When attracted, the armature 189 swings the lever 190 in a counterclockwise direction, Fig. 6, and draws the wire 192 to the right, urging pawl 186 into cooperation with bar 184. The wires 192 are guided by a slotted plate 194, and the pawls 186 are aligned by slots in a plate 195 fastened on a supporting bar 196, the plate being used also to secure one end of springs 188. The edge of bar 196 cooperates with a cam face 197 on pawls 186 to hold the selected pawls into cooperation with bar 184 as the bar is lowered.

The controlling magnet PM is energized throughout the punching operation wherein the punch plunger 18 is lowered and raised again and with the machine operating at slow speed will maintain the pawl 186 in engagement with bar 184. To insure against the possibility of pawl 186 being jarred out of engagement when the machine is operated at high speed, the cam face 197 is provided to insure maintenance of the connection, but the use of such cam face 197 is in the nature of a precautionary or safety device and is not absolutely essential to the successful operation of the punching mechanism.

An extension 295 on a fixed bar 198 cooperates with the upper ends of the pawls to cam them in a counterclockwise direction out of engagement with the ascending bar 184 on the return stroke of the bail. This also is for the purposes of safety when operating at high speed and in the event that the normal restoring spring 188 of pawl 186 does not promptly disengage the pawl or if any residual is present in magnet PM tending to retard such restoration. In order to positively hold the pawls in disengaged position, the end of bar 184 cooperates with a cam face 199 on each pawl. There is a limit to the downward motion of the plungers 18 because of the presence of a fixed bar 296 which projects into notches 297 cut in the side of plungers 18. The plungers are guided above the holes in the die 167 by sliding in a fixed bar 310 and the stripper plate 166. The operation of punching is timed to occur during the pause in card feeding when the Geneva wheel 109 is not in action. The eccentric 172 is placed on the shaft 25 in such a position that the bail 177 is reciprocated while the roller 107 is out of engagement with wheel 109. As the bail and bar 184 are reciprocated, any of the pawls may be moved over by the call wires until notches 185 engage the end of bar 184. Then the connected pawls and plungers are depressed to perforate the card and quickly withdraw therefrom to permit the feeding of the card to continue to the next index position.

*The wiring diagram*

The electrical connections between the devices of the machine may be studied by reference to the wiring diagram shown in Figs. 10A and 10B. When the switch PS is closed the machine is connected to the source of electrical energy through the two main lines 200 and 201.

When it is desired to use the machine for straight gang punching, a master card is inserted at the bottom of a group of blank cards in the punch hopper P and all the reproducing switches RS1, RS2, RS3, and RMS are set to the "off" position because the reproducing station is not used during this operation. The cards in the hopper P actuate the card lever PHL, close contacts PHC and energize magnet M4 through a circuit from line 200, wire 202, bar 203, magnet M4, wire 204, contacts PHC and wire 205 to line 201. The start key ST is depressed and a circuit may be traced from line 200, wire 206, magnet MRM, wire 207, magnet M1, contact C2 normally closed, start key contacts STC, wire 208, switch RS3, wire 209, wire 210, stop key contacts SPC, contacts 14B and wire 211 to line 201. The energized motor relay magnet MRM closes contacts MRC and operates the motor M through wires 212, 213, and 214 between the main lines. The other energized magnet M1 closes contacts 1A to hold the circuit for most of the cycle, and closes contacts 1B to energize the punch clutch magnet PCM. The holding circuit is traced from line 200 through wire 206, magnet MRM, wire 207, magnet M1, contacts 1A, wire 215, contacts C3 closed until near end of cycle, and wire 216 to line 201. The clutch magnet circuit runs from line 200 through punch clutch magnet PCM, wire 217, wire 218, switch RS1 at "off", upper contacts 6A, wire 219, contacts 1B, wire 220, contacts C1 and wire 221 to line 201. Through the clutch connection thus made, the punch picker is operated to feed the master card out of the hopper and between the punch and die at the punching station. During this first card cycle, the card operates the die card lever DCL and closes contacts DC1 which in turn close a circuit from line 200 through magnets M2 and M3, wire 222, contacts DC1 and wire 223 to line 201.

The energized magnet M2 then closes contacts 2B and provides another holding circuit through magnets MRM and M1 to hold the same energized while contact C3 is opened. This circuit may be followed from line 200 through wire 206, magnet MRM, wire 207, magnet M1, contacts 1A, contacts 2B, contacts 4B already closed by magnet M4, wire 224, switch RS2, wire 210, contacts SPC, contacts 14B and wire 211 to line 201. Then the motor M will keep running and cards will be fed from the hopper P as long as they are present or until the stop key SP is depressed.

During the second card feeding cycle, which takes place automatically, the master card passes between the die and punches over to the sensing station at the same time that the first blank card immediately following the master card is moving from the hopper P to the punching station. Next, the punch card lever PCL is operated and contact PC1 is closed completing a circuit from line 201 through the impulse distributor contacts C15 which are closed during the sensing of each index point position and while the punch actuating bar is making reciprocation, through contacts PC1, wire 225, contacts P1 closed throughout punching, common brush 226, common contact roller 227, sensing brushes 19, sockets J1, plug wires (not shown) to sockets J4, through the punch control magnets PM, common bar 228, contacts 12B and line 200. The master card is moving in synchronism with the blank card, the former going under the brushes 19 and the latter under punches controlled by magnets PM. All the holes 9 to 12 inclusive, punched in the master card will be punched in the blank card if the related columns are connected by plug wires.

The newly punched card is fed in turn from the punching station to the sensing station as a second blank card is fed through the punching station. Thus the newly punched card acts as a master card to control the punching of the second blank card, and the second card controls the punching of the third, etc., until all of the blank cards are gang punched.

If more than one group of cards, and more than one master card, are placed in the punch hopper P at one time, it is necessary to have the interspersed master cards punched with a special perforation at the 11 index point position in some predetermined column and the punch master card brush 17 adjustably set to sense that column. Then the punch master card switch PMS should be set to the "on" position. This is done to effect controls to prevent the punching of an interspersed master card under control of the last card of the previous group. As the master card feeds into the punch station, the brush 17 is permitted to close a circuit early in the cycle and thereby energize control magnet M10 through the following connections: line 201, wire 229, contacts C5 closed as the special perforation position is sensed, wire 230, contact bar 231 and the connected bar 232, brush 17, switch PMS, contacts 3A closed when a card is in the punching station, wire 233, magnet M10, magnet M11, bar 234 and wire 235 to line 200. The energized magnet M10 closes contacts 10A to establish a holding circuit and operates contacts 10B to set up another circuit. The holding circuit may be traced from line 200 through wire 235, bar 234, magnets M11 and M10, contacts 10A, wire 236, contacts P2 held closed until the next cycle, and wire 237 to line 201. Thus, the magnet M11 is energized and held in such a condition which enables it to open contacts 11A and deenergize the reproducing feed clutch magnet RCM.

This is done to prevent feeding of a pattern card with a master card during combined gang punching and reproducing as described more fully hereinafter.

The other circuit through contacts 10B may be followed from line 200, wire 235, bar 234, magnet M12, wire 238, contacts 10B, wire 239, contacts C7 closed early in the cycle, wire 240 and wire 229 to line 201. The energized magnet M12 opens contacts 12B to prevent punching, and closes contacts 12A to establish a holding circuit which may be traced through line 200, wire 235, bar 234, magnet M12, contacts 12A, wire 241, contacts P3 held closed during the punching cycle, wire 242 and wire 237 to line 201. The magnet M12 is held energized and the contacts 12B are held open preventing any impulses from passing through magnets PM and preventing the punching of an incoming master card with the data on the last card of the outgoing group.

This same special perforation control which is described hereinbefore as disabling punching of a master card and feeding of a pattern card, may also be used for field selection control in selecting a field of data on the master card to be duplicated in a certain other field on the blank cards.

In other words, the data on the master card may be shifted or eliminated in transference to the record cards, according to the presence or absence of the special perforation. The circuit for this control involves the use of the wiring including contacts 12A which are closed when the master card brush 17 senses a special perforation as explained hereinbefore.

The control also involves the use of a class control magnet M16, a plurality of class selection magnets CSM and sets of contacts 243, 244 controlled thereby, the number used depending on the number of columns of data over which control is desired. The brush 17 senses a special perforation in the master card just prior to the time the card enters the die station. Therefore, it is necessary to hold the class selection magnets CSM energized until the card has passed beyond the brushes 19. This is accomplished by establishing another holding circuit through a magnet M15 before the magnet M12 is deenergized. Then M15 holds the magnets CSM energized as the master card is analyzed.

The magnet M16 is wired in parallel with magnet M12 and in series with the control wires as is seen by tracing from line 200, wire 235, bar 234, magnet M16, wire 544, socket J16, a plug wire to socket J17, wire 245, contacts 12A, wire 241, contacts P3 and wires 242 and 237 to line 201. The energized magnet M16 closes contacts 16A to prepare M15 for a holding circuit on the following cycle as the master card passes under the sensing brushes 19. The contacts C8 close before P3 breaks thus setting up relay M15. The circuit including contacts 16A may be followed from line 200, wire 235, bar 234, magnet M15, wire 246, contacts 16A, wire 247, contacts C8 and wire 229 to line 201. Then a holding circuit for magnet M15 is established through contacts 15A, wire 248, contacts P4 and wire 237 to line 201. The circuit is held through contacts P4 until the master card passes beyond brushes 19. Other contacts 15B are closed by magnet M15 and serve to energize the class selection magnets CSM. The circuit through these magnets may be traced from line 200, through wire 543, wire 249, magnets CSM, socket J19, plug wire to J20, contacts 15B, wire 250, wire 239, contacts C7 and wires 240, 229 to line 201. The circuit through the magnets is held until the contacts P4 are opened and the contacts 15B follow when magnet M15 is deenergized.

Each magnet CSM cooperates with a set of class selection contacts 243, 244, and if a special perforation is sensed, contact 244 is opened and contact 243 closed.

The contacts 243, 244 are connected between the sensing brushes 19 and the punch magnets PM. The common contact is connected through socket J9 and a plug wire to socket J4 in line with one of the punch magnets PM. The contact 244 is connected in line by a plug wire from socket J7 to socket J1 in line with a brush 19 related to the punching magnet PM wired to socket J4. The other contact 243 is wired through socket J8 to socket J1B which is in line with a brush 19 that cooperates with a special field on the master card that is sensed effectively only on the appearance of a special perforation in the master card. With the connections made as outlined, should no special perforation be sensed, the impulse from brush 19 is directed straight through socket J1, contacts 244, socket J9 and over to socket J4. Should a special perforation be sensed the contact 243 is shifted closed for two card cycles as explained hereinbefore and the impulses from the brush 19 in a special field are directed through socket J1B, socket J8, contacts 243, socket J9 and over to socket J4. After the master card passes the sensing brushes 19, the contacts 244 are again allowed to close to duplicate the selected data from the first punched record card to the following cards.

If the machine is to be used straight card for card reproducing all the switches RS1, RS2 and RS3 are thrown to the "on" position, blank cards are inserted in the feed hopper P and the original or pattern cards are placed in the hopper R. The cards in hoppers P and R operate the respective hopper levers PHL and RHL, closing contacts PHC and RHC, and energizing magnets M4 and M5. Magnet M5 is connected in line with contacts RHC by connections from bar 203, magnet M5, wire 252, contacts RHC and wire 253 to line 201. When the start key ST is depressed, a circuit may be traced from line 200, wire 206, magnet MRM, wire 207, magnet M1, contacts C2, contacts STC, lower contacts 4A, lower contacts 5A, wire 254, contacts SPC, contacts 14B and wire 211 to line 201. Magnet MRM closes contacts MRC and the motor M is energized. If cards had not been placed in either hopper, contacts 4A or 5A would not have closed, and the machine could not be started. The starting circuit is held through contacts 1A and contacts C3.

Contacts 1B are closed and when contacts C1 close, a circuit may be traced from line 201, wire 221, contacts C1, wire 220, contacts 1B, upper contact 2A, wire 217, magnet PCM, to line 200; also from contacts 1B, through wire 219, upper contact 6A, switch RS1, contacts 11A and reproducing clutch magnet RCM to line 200. Thus both the card feed clutch magnets RCM and PCM are energized causing the first pattern card in the R hopper and the first blank card in the P hopper to feed to the reproducing sensing station and to the punching die station respectively. At the mid-point of this feeding cycle, the pattern card operates the card lever RCL1 and the record card actuates lever DCL, closing contacts RC1 and DC1, respectively, and energizing magnets M2, M3, M6 and M7. Magnets M6 and M7 are connected in series with contacts RC1 by wires 255 and 256.

Before the contacts C3 open during the first feed cycle, another holding circuit is established through contacts operated by magnets M2, M6, M4 and M5. The circuit runs from line 200, wire 206, magnet MRM, wire 207, magnet M1, contacts 1A, contacts 2B, contacts 4B, contacts 5B, contacts 6B, contacts SPC, contacts 14B and wire 211 to line 201. Thereby the magnets MRM and M1 are maintained energized, the motor runs and the card feed clutches operate until the cards are all out of a hopper, or they fail to feed therefrom, or the stop key is depressed.

The other contacts 2A and 6A controlled by magnets M2 and M6 are operated so that the current for the punch clutch magnet PCM goes through wire 257 and lower contact 6A, and the other clutch magnet RCM is held energized through wire 258 and lower contact 2A.

As an indication to the operator that the cards are not feeding properly, the machine will stop if either the die card lever contact DC1 or the reproducer card lever contact RC1 is opened by failure in the feeding of either card. However, the motor M may be started when the start key ST is depressed, and only the feed clutch in the hopper from which a card failed to feed will operate until both sets of cards are again brought into concurrent feeding relationship. For example, if a blank card failed to feed from the hopper P, the die card lever contacts DC1 will open causing magnet M2 to be de-energized releasing contacts 2A and preventing the reproducer clutch magnet RCM from being energized therethrough, but allowing magnet PCM to be energized through wire 217 and upper contact 2A.

The connections to magnet RCM are opened at lower contact 2A and at upper contact 6A. The clutch magnet PCM is energized alone on each cycle until a blank card is fed from the hopper P into the punch and die station.

When the cards are feeding properly in reproducing, the pattern card is sensed under the brushes 15 in synchronism with the passage of a record card under the punches controlled by magnets PM. The magnets are controlled by impulses from the brushes over circuits such as the one running from line 201, through the impulse distributor contact C15, wire 259, contacts RC2 closed by the reproducer sensing station card lever RCL2, wire 260, contacts R1 closed during a reproducing cycle, common brush 261, contact roller 262, sensing brush 15, socket J2 and a plug wire to socket J4, magnet PM, bar 228 and contacts 12B to line 200. Any number of the column sensing sockets may be plugged to any of the punching sockets in this way for the control of reproduced punching.

Class selection, elimination or field selection control may be exercised in transferring the data to be reproduced from one field on the original card to a selected field on the blank card or from one of two fields on the original card to the blank card. The control may be effected by a special perforation in either the otherwise blank cards or the perforated original cards. The socket J19 may be plugged to J17 or J18. If, for example, it is desired to select class control from X holes in the original or pattern cards, the switch RMS is closed at "on" and the reproducer pattern card brush 14 is made effective by plugging from J18 to J19.

Then when a special perforation appears, a circuit may be traced from line 201, contacts C5, wire 230, contact bar 231, brush 14 adjustable to any column, switch RMS, contacts 7A closed by M7 when a card operates card lever RCL, wire 263, magnet M8, bar 234 and wire 235 to line 200. The energized magnet M8 closes contacts 8A to establish a holding circuit and operates contacts 8B to set up another circuit. The holding circuit is from line 200, wire 235, bar 234, magnet M8, contacts 8A, wire 264, contacts R2, wire 265 and wire 266 to line 201. The other circuit is from line 200, wire 235, magnet M9, wire 267, contacts 8B, wire 268, contacts C6 and wire 229 to line 201. This energization of magnet M9 is made early in the pattern card sensing by a circuit through the magnet and associated contacts 9A, wire 269, contacts R3 and wire 266 to line 201.

The energization of the class selection magnets CSM is brought about immediately when the brush 14 senses a special perforation. The circuit is held by the closing of the associated contacts SMC and contact P3 until the completion of that reading cycle.

The magnets CSM cooperate with a number of contact switches 243, 244 as already explained, but in the present instance, when used for classifying reproduced data, the contacts are connected between brushes 15 and punch magnets PM. For class selection control the socket J9 is connected to socket J2 by a plug wire. And socket J7 is connected to socket J4A while socket J8 is wired to socket J4B. For class elimination of punching, either J7 or J8 is disconnected. For field selection, J9 is wired to J4 while J7 is connected to J2A and J8 is connected to J2B. Any number of sets of contacts may be so wired to get class selection control over a plurality of card columns.

Other controls are provided for punching at the zero index point of the card in any column or columns. If it is desired to expand the field of data on a new record card, or to punch zero in one or more columns on the card, the corresponding sockets J4 are connected to sockets J23 by plug wires. Then a circuit may be traced from line 201, impulse contacts C15, contacts C4 closed at the zero index point, contacts 3B closed when a card is under the punches, wire 270, socket J23, plug wire to socket J4, magnet PM, bar 228, contacts 12b and line 200. Other contacts such as C4 may be provided and timed to close at any index point to punch corresponding holes in the record cards.

As explained hereinbefore, the class selection contacts may be wired to get class selection control with any contacts such as contacts C4. The wiring may be arranged to direct a zero perforation control circuit through contacts 243. With a plug wire between sockets J22 and J9, and another plug wire between sockets J4B and J8, then zero perforations would be produced under class selection control by the special perforations in the original cards.

A control in punching may be effected to separate the data in the same column on a card. The readings of the special X or R perforations at the 11 and 12 index positions on the card may be directed differently from the readings of the regular numeral data at the 0–9 index positions in the same column. For this purpose cam C10 operates between contacts 271 and 272 so that contact 271 is opened after the 11 index position is passed and therefore contact 272 closes before the 0 index point is sensed. The socket J15 leading from the common contact may be connected by plug wire either to socket J1 or socket J2 in the gang punch sensing and reproducing sensing stations respectively. Then with socket J13 connected to socket J4A the special perforations X or R will be perforated in that column, and with socket J14 connected to socket J4B the regular numeral data will go into the associated column. Any number of such contacts may be employed and the connections may be made from any selected columns to any other columns. This disconnection of the plug wire from socket J13 or J14 eliminates the associated portion of the data.

Checking devices are provided for checking the perforations in the newly punched record card with the perforations in the original or pattern card. This feature is used to check the reproduced data. An extra sensing station comprising brushes 16 is used to sense the pattern cards as they pass from the reproducing punch control station comprising brushes 15. The other record cards are sensed by the same brushes 19 which are used in gang punching. They sense the newly punched record cards as they pass from the punching station.

The checking control magnets such as magnets CHM1 and CHM2 are connected between related columns of brushes 16 and 19. These magnets are in the form of duocircuit relays each consisting of two coils wound in such a way that the polarity is the same on both ends of the core, One coil is connected to the sensing brush 19 and the other coil is connected to brush 16. There is one such magnet for each column to be checked.

As a newly punched record card is passing from the punching station through the sensing brushes 19, the associated pattern card passes from the reproducing sensing station to the checking sensing station with brushes 16. The checking card lever CHCL is operated by the pattern card, closing contacts CHC and energizing magnet M13 through wires 278, 279. If the perforations in both agree and coincide, parallel circuits may be traced from line 201, impulse contacts C15, card lever contacts PC1, wire 225, contacts P1, common brush 226, roller 227, brush 19, socket J1 and a plug wire to socket J5A, wire 273, then through one coil of magnet CHM1, contacts 13B to line 200.

The other parallel circuit is from line 201, contacts C15, wire 259, wire 276, contacts 13A, wire 27, contacts P5, common brush 280, roller 281, brush 16, socket J3, plug wire to socket J6A, wire 275, through the other coil of magnet CHM1, bar 274 and through contacts 13B to line 200. Thus the magnetizing effect of each coil is neutralized by the current flow through the other coil and the armature and associated contacts CHC1 of the relay are not picked up.

If a perforation in one card does not appear simultaneous with a perforation in the other card, there is an error in punching and only one coil of relay magnet CHM1 is energized. This disturbs the balance of the relay and the associated contacts CHC1 are closed setting up a control circuit. The circuit may be traced from line 201, through wire 381, contacts C9, wire 282, contacts CHC1 or similar parallel contacts, wire 283, magnet M14 and wires 284, 285 to line 200. A lamp L is lighted and continues to give a visible indication of an error as long as magnet M14 is energized. The magnet M14 establishes a holding circuit through associated contacts 14A. The circuit may be traced from line 200 through wires 285, 284, magnet M14, contacts 14A, wire 286, contacts RC and wire 287 to the line 201. The checking holding circuit may be opened by the operator by depressing the non-check reset key NCR to actuate contacts RC.

The magnet M14 not only serves to hold the lamp L lit, but also acts to stop the machine. The contacts 14B in series with the stop key contacts SPC are opened when magnet M14 is energized. The machine cannot be started again until the non-check reset key NCR is depressed, deenergizing magnet M14 and putting out the light in lamp L. The operator may then depress the start key ST for one cycle, feed the cards to the stackers and then extract them to make whatever corrections are necessary.

The checking circuits may be arranged to check the class selected perforations that are made while reproducing. The class selection of punching is accomplished on one cycle and on the following cycle the checking magnets are effective to check the class selected data. The class control magnet M16 is operated as already explained, now being wired to the socket J18 and controlled by brush 14. The class selection magnets CSM also serve to shift contacts 243, 244 as explained. Other checking control magnets CHM are provided and controlled similar to the manner of operating magnets CSM, there being an additional connection made to plug socket J22 from socket J21. During the cycle that the magnet M16 is energized because of a special perforation, cam contacts C8 close completing a circuit through magnet M15. This magnet is held energized during the punching cycle, and in turn closes contacts 15B and energizes the checking magnets CHM by a circuit from line 200, wire 543, wire 249, magnets CHM, socket J21 and plug wire to socket J22, bar 288, contacts 15BB, wire 250, wire 239, contacts C7, wires 240 and 229 to line 201. The circuit is held throughout the checking cycle by the closing of the holding contacts CHC and the machine operated contacts P3.

The circuit may be traced from line 200, wire 543, wire 249, magnet CHM, contacts CHC, wires 289, 251 and 241, contacts P3 and wires 242, 237 to line 201. Each magnet CHM is associated with a set of class selection contacts 290, 291 which are attached to plug sockets J10, J11 and J12. These class checking contacts are connected in series with the checking sensing brushes 16 and 19 at the same time that the other class selection contacts 243, 244 are connected in series with the punch controlling brushes 15 and punch magnets PM. The checking series circuit includes the checking magnets CHM1, CHM2, etc., as many of these magnets being provided as there are columns of data to be checked. As an example of wiring connection to be made for checking class selection reproduced information, the socket J12 may be connected to socket J1, socket J10 is plugged to J5A and J11 is attached to J5B, and J6A is wired to J3A while J6B is wired to J3B. With these connections, the field of data selectively punched by the energization of magnet CSM, is also selectively checked by the energization of magnet CHM, the closing of contact 290, and the selective effectiveness of magnet CHM2. If the class selected perforated data on the record card fails to agree with the data on the original pattern card, the machine is stopped and the lamp is lighted.

Connections may be made in the machine for the performance of combined gang punching and reproducing of data on record cards. For such work, connections are made from gang punch control brushes 19 to certain of the magnets PM, while connections are made from the reproducing punch control brushes 15 to others of the punch magnets PM.

Several groups of blank cards with master cards may be placed in the hopper P at the same time that a set of pattern cards are placed in the hopper R.

It is not necessary to place blank cards in with the pattern cards to correspond with the master cards during concurrent feeding. Controls are provided to hold up the feeding of the pattern cards while a master card passes from the other hopper. This is controlled by the brush 17 which senses a special perforation denoting a master card. The magnet M11 is then energized as already explained. The contacts 11A in series with the reproducing clutch magnet RCM are opened by the magnet M11 to disable the feeding of the pattern cards for one cycle. In other words, when a master card is encountered at the brush 17 of the die station, the reproducer feed is held up for one cycle to allow the master card to proceed to the sensing brushes 19. Then all three cards are fed, the blank card receiving gang punch data from the preceding card and reproduced data from the concurrently fed pattern card. The reproduced portion of the data may be checked with the original.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine for reproducing a set of perforated record cards under control of a set of pattern cards, card feeding means for feeding cards from both sets in synchronism comprising Geneva drive gearing for feeding the record cards with intermittent movement, means for sensing the pattern cards, perforating devices, and means under control of the sensing devices for operating the perforating devices to punch the record cards to correspond with the pattern cards.

2. In a machine for reproducing a set of perforated record cards under control of a set of pattern cards, a line of punches, a line of sensing brushes, means for feeding the pattern cards comprising Geneva drive gearing for feeding the record cards in synchronism with the pattern cards and with movement transverse to the lines of punches and brushes respectively, interposer pawls connected to said punches and selected by magnets controlled by said sensing brushes, an actuator for operating selected pawls and connected punches, and an eccentric on said Geneva gearing for operating said actuator during each intermittent pause in card feeding.

3. In a card punching mechanism, a punch actuator, a punch plunger, an interposer pawl mounted on said plunger and adapted to be selectively urged into cooperation with said actuator, means for selecting said pawl, a pair of fixed bars in said mechanism, a cam face on said pawl cooperating with one of said bars to hold the pawl in engagement with said actuator, and another cam face on said pawl cooperating with the other of said bars to disengage the pawl from the actuator.

4. In a machine for gang punching a group of record cards under control of a master card, a line of punches each being correlated with a column of a record card and each adapted to perforate in any one of a plurality of positions in a card column, sensing means adapted to cooperate with the cards, means comprising Geneva drive gearing for feeding the cards successively, first past the punches and then past the sensing means, the master card leading and the other cards following with synchronized and intermittent movement, and means under control of said sensing means for operating said punches so that each card is perforated to correspond with the preceding card.

5. In a machine for gang punching groups of record cards under control of interspersed master cards, perforating devices, card sensing devices, means for feeding the cards successively with a synchronized and intermittent movement, first past the perforating devices and then past the sensing devices, means for operating said perforating devices under control of said sensing devices so that each card is perforated with the data sensed on the preceding card, and means under control of a special perforation in a master card for disabling said perforating devices as said master card passes said perforating devices.

6. In a machine for gang punching a group of blank record cards under control of a master card, a punching station, a sensing station, a card feeding means, devices for controlling the feeding means to feed the master card through the punching station, perforating devices at the punching station, means for disabling said devices as the master card passes, and sensing devices at said sensing station for analyzing the master card and controlling said perforating devices to punch the first record card to correspond with the preceding master card, the punching operation continuing as the blank cards follow in succession.

7. In a machine for gang punching and reproducing a group of perforated record cards under control of a master card and a set of pattern cards, perforating devices, means for sensing said master card and said record cards, means for feeding the record cards in succession first past the perforating devices and then past the sensing means, the master card leading and the record cards following with a synchronized and intermittent movement, means under control of the sensing means for operating said perforating devices to perforate each record card according to the data on the card preceding it, other means for sensing said pattern cards, other feeding means connected to said first mentioned feeding means for feeding said pattern cards in succession past other sensing means in synchronism with the movement of said record cards, and means under control of said other sensing means for operating said perforating devices to perforate each record card with data corresponding to the data on a pattern card.

8. In a machine for gang punching and reproducing groups of perforated record cards under control of interspersed master cards and a set of pattern cards, perforating devices, means for sensing said master cards and said record cards, means for feeding the record cards and the master cards in succession, first past the perforating devices and then past the sensing means with a synchronized and intermittent movement, means under control of the sensing means for operating said perforating devices to perforate each record card according to the data on the card preceding it, means under control of a special perforation in a master card for disabling said perforating devices as said master card passes said perforating devices, other means for sensing said pattern cards, other feeding means connected to said first mentioned feeding means for feeding said pattern cards in succession past said other sensing means in synchronism with the movement of said record cards, means under control of said other sensing means for operating said perforating devices to perforate each record card with data corresponding to the data on a pattern card, and means under control of a special perforation in a master card for disabling said other feeding means while the master card is passing under said perforating devices.

9. In a machine for reproducing a set of perforated record cards under control of a set of pattern cards having data in a plurality of fields, means for sensing the pattern cards, means for perforating the record cards, means for feeding cards in synchronism, the pattern cards cooperating with sensing means and the record cards cooperating with the perforating devices, means under control of a special perforation in each pattern card for selecting the field of data on the pattern card to control the perforation of a corresponding record card, and means under control of the sensing devices in the selected field for operating said perforating devices to punch a record card to correspond with the data on the pattern card.

10. In a machine for reproducing perforated record cards under control of pattern cards, means for sensing the pattern cards, means for perforating the record cards in a pair of fields, means for feeding the cards in synchronism, the pattern cards past the sensing means and the record cards past the perforating devices, connections from said sensing means to either of the fields of perforating devices, means under control of a special perforation in a pattern card for selecting the perforating field to be connected to said sensing means, and means under control of the sensing devices for operating the perforating devices in the selected field to punch the record card to correspond with the data on the pattern card.

11. In a machine for reproducing a set of record cards under control of pattern cards, means for sensing the pattern cards, means for perforating the record cards, means for feeding the cards in synchronism with the pattern cards passing the sensing means and the record cards passing the perforating devices, connections between the sensing means and the perforating devices, means under control of a special perforation in a pattern card for disabling said connections, and means under control of the sensing devices for operating the perforated devices when connected thereto to punch record cards to correspond with certain of the pattern cards.

12. In a machine for gang punching a group of record cards under control of a master card, perforating devices, card sensing devices for sensing a pair of fields on the cards, means for feeding cards in succession, first past the perforating devices and then past the sensing devices, the master card leading and the record cards following with a synchronized and intermittent movement, means under control of a special perforation in said master card for selecting the sensing devices in either of the fields for control over said perforating devices, and means for operating said perforating devices under control of said selected sensing devices so that all the cards are perforated with the data selected from the field on the master card.

13. In a machine for gang punching and reproducing a group of perforated record cards under control of a master card and a set of pattern cards, perforating devices adapted to perforate said record cards, means for sensing a pair of fields on said master card and said record cards, means for feeding the record cards in succession first past the perforating devices and then past the sensing means, the master card leading and the record cards following with a synchronized movement, means under control of a special perforation in said master card for selectively connecting either of said fields of the sensing means to the perforating devices, means under control of the selected sensing means for operating said perforating devices to perforate each record card according to the selected data on the preceding card, other means for sensing a field on said pattern cards, other feeding means connected to said first mentioned feeding means for moving said pattern cards in succession past said other sensing means in synchronism with the movement of said record cards, other perforating devices adapted to perforate either of two fields on the record cards, means under control of a special perforation in said pattern cards for selectively connecting said other sensing means with either field of said other perforating devices, and means under control of said other sensing means for operating the selected perforating devices to perforate each record card with the selected data corresponding to the data on a related pattern card.

14. In a machine for gang punching and reproducing a group of perforated record cards under control of a master card and a set of pattern cards, perforating devices adapted to perforate said record cards, sensing devices cooperating with said record cards and a pair of fields on said master card, means for feeding the cards in succession, first past the perforating devices then past the sensing devices, the master card leading and the record cards following in synchronism, means under control of a special perforation in said master card for selectively connecting either field of the sensing devices with said perforating devices, means under control of the selected sensing devices for operating the perforating devices to punch each record card according to the selected data on the card preceding it, other means for sensing a pair of fields on said pattern cards, other feeding means connected to said first mentioned feeding means for moving said pattern cards in succession past said other sensing means in synchronism with the movement of said record cards, means under control of special perforations in said pattern cards for selectively connecting either field of said other sensing means to said perforating devices, and means under control of the selected sensing means for operating the perforating devices to punch each record card with data corresponding to the selected data on the related pattern card.

15. In a machine for reproducing a perforated record card under control of a perforated pattern card, said pattern card having a special perforation and another perforation in the regular data index positions in the same column, a device for sensing the perforations in said pattern card, a plurality of perforating devices for punching in a plurality of columns on said record card, means for feeding the record card and the pattern card in synchronism past the perforating devices and said sensing means respectively, a connection from any of said perforating devices to said sensing device, said connection being maintained as the special perforation is sensed, other connections from any of said perforating devices to said sensing device, said other connections being maintained as the regular data index positions are sensed, selective means for disconnecting either of said connections from the perforating devices, and means under control of the sensing means for operating the connected perforating devices to punch the record card with data corresponding to the selected data on the pattern card.

16. In a machine for reproducing a set of perforated record cards under control of a set of perforated pattern cards, means for sensing the pattern cards, means for perforating the record cards, a second sensing means for cooperating with said pattern cards, and a third sensing means cooperating with said record cards, means for feeding the cards singly from both sets in synchronism, a record card passing first under the perforating means as the related pattern card passes the first mentioned sensing means, and then the record card passes said third sensing means as the pattern card passes said second sensing means, means under control of the first mentioned sensing means for operating the perforating means to punch the record cards to correspond with the pattern cards, an indicating device, and checking devices connected between said second and said third sensing means and operative to disable said feeding means and operate said indicating device when the perforations on the record card and related pattern card do not coincide.

17. In a machine for checking perforated reproduced record cards with perforated pattern cards, means for sensing the pattern cards, devices for sensing two fields of data on said record cards, means for feeding the cards in synchronism, the pattern cards past the sensing means and the record cards past the sensing devices, connections from said sensing means to either of the two fields of sensing devices, means under control of the pattern card for selecting the field of devices to be connected to said sensing means, and means under control of the connected sensing means and devices for disabling said feeding means when the perforations in a pattern card and in a selected field on a record card fail to agree.

18. In a machine for reproducing a set of record cards under control of a set of pattern cards, separate means for feeding cards from both sets, means for sensing the data on the pattern cards, means under control of said sensing means for perforating the blank record cards to correspond to the related pattern cards, devices for stopping the machine if either feeding means fails to feed a card, a start key, and means under control of the start key for automatically operating the particular feeding means in which failure occurred until a card is fed.

19. In a card feeding and punching device, a series of punches, means for operating said punches, a Geneva gear, means for operating the gear, card feeding rollers operated under control of said Geneva gear to feed the cards under the punches, a clutch between said gear and said rollers, a card picker mechanism operated under control of said operating means, another clutch between said mechanism and said means, and a releasing means for operating the first mentioned clutch under control of the second mentioned clutch.

20. In a machine for gang punching perforated record cards in groups, perforating devices, means for feeding the cards to cooperate with the perforating devices, means for setting up data to control the perforating devices to perforate the first group of cards, and means for operating said data setting up means automatically between groups to control the perforating devices to perforate following groups of cards.

21. In a machine for gang punching perforated record cards in groups under control of interspersed master cards, perforating devices, card sensing devices, means for feeding the cards successively to cooperate with the perforating and sensing devices with a master card leading an associated group of cards, means for operating said perforating devices under control of said sensing devices so that each card of a group is perforated with data on the related master card, and means under control of the master cards for changing the perforation control data between groups.

22. In a machine for reproducing record cards under control of pattern cards having columns of index points with perforations at one or a plurality of points along each column, means for sensing the columns of the pattern cards, means for feeding the cards in the direction of the length of the columns of index points, and perforating devices under control of the sensing means and cooperating with the cards to be reproduced to perforate them at one point or a plurality of points along each column to correspond to the associated pattern card.

23. In a machine for gang punching groups of record cards under control of master cards having columns of index points with perforations at one or a plurality of points along each column, means for sensing the columns of perforations in the master cards, means for feeding the cards in the direction of the length of the columns of index points, a master card leading and an associated group of cards following in succession, and perforating devices under control of the sensing means and cooperating successively with all cards of the group to perforate them at one point or a plurality of points along each column to correspond to the related master card.

24. In a machine for reproducing perforated record cards under control of pattern cards and master cards, means for sensing the pattern cards, perforating devices, means under control of said sensing means for operating said perforating devices to perforate reproduced record cards in certain fields, means for sensing each master card for an initial reading and sensing associated record cards for an automatic repetition of said reading, means under control of the last mentioned sensing means for operating said perforating means to perforate said record cards in other fields.

25. In a card reproducing machine with a set of pattern cards and groups of blank cards with interspersed master cards, means for sensing the pattern cards, means under control of said sensing means for reproducing the data on said pattern cards on said blank cards, other means for sensing said master cards, and means under control of said other means for reproducing the data on each master card on the associated group of blank cards.

26. In a machine for reproducing perforated record cards under control of pattern cards, means for sensing a pattern card, means under control of said sensing means for perforating a card, means for pereforating extra zero perforations in said perforated card, and means under control of a special perforation in said pattern card for controlling the operation of said zero perforating means.

27. In a machine for producing perforated record cards under control of pattern cards, perforating devices for said record cards, electrical contacts for controlling said perforating devices and adapted to make said devices effective at certain index points on the record cards, connections between said contacts and said devices, and means under control of said pattern cards for operating said connections to perforate selectively certain of said record cards under control of said contacts.

28. In a machine for checking perforated reproduced record cards with perforated pattern cards, means for perforating the record cards under control of the pattern cards, a sensing means cooperating with only the record cards, another sensing means cooperating with only the pattern cards, means for feeding the record cards successively through the first mentioned sensing means, means for feeding the pattern cards in succession through the second mentioned sensing means in synchronism with the feeding of the record cards, related record and pattern cards being sensed at the same time, connections between said sensing devices for operating when the perforations in the cards fail to coincide, and means under control of said connections for indicating when a related pair of cards fail to coincide.

29. In a machine for perforating records having a plurality of rows of index values disposed along one dimension thereof and grouped in vertical columns along another dimension thereof, a plurality of dies, a punch for each of said dies, a single mechanical member for driving said punches, an electrically controlled interposer for each punch adapted to associate its punch in driving relation to said member only while energized, record feeding mechanism including a series of feed rolls operating in steps to successively position said record with the index values along said first dimension beneath the punches, each succeeding step presenting index values differing by one, whereby each stroke of the mechanical member causes the punches whose interposers have been actuated to perforate index positions in the record along said first dimension, and means for driving said member and said feeding mechanism in definite timed relation to each other.

30. In a machine for perforating records having a plurality of rows of index values disposed along one dimension thereof and grouped in vertical columns along another dimension thereof, a plurality of dies and punches therefor, a single mechanical member for driving said punches, an interposer for each of said punches, each adapted to be positioned between its punch and said member, electrical means for moving said interposers into and out of engagement with said member and said punches, means for actuating said member, and a series of feed rollers and means for moving the same in steps to control the motion of said record after each actuation of said member.

31. A machine as claimed in claim 30 in which an associated device, having a sensing means operating in time relation to said machine, institutes impulses under control of a record passing through said sensing means for controlling said electrical means.

32. In a record controlled machine, a sensing means, punching means including a plurality of punches, a single mechanically driven member for driving all said punches, an interposer for each punch adapted to be positioned between the same and said member whereby the latter may drive the punches through the medium of said interposers, a control magnet for each interposer adapted to position its interposer between its punch and said member only during the time said magnet is energized, means to deliver a control record to said sensing means and a blank record to said punches simultaneously, said last means including a step by step feeding device comprised of a series of feed rolls maintaining positive control over the records adapted to advance them in steps corresponding to successive index position values, and interconnections between said sensing means and said control magnets.

33. In a record controlled machine in combination, control records having index points arranged thereon, blank records to be punched, a sensing device including a plurality of brushes, a plurality of punches and dies therefor, a single mechanical driving member adapted to drive all said punches, a plurality of interposers associated with said member in reciprocative relation, an electro-magnet for and mechanically linked to each of said interposers and adapted, when energized, to position and retain the latter between the punches and said member whereby the member may drive one or more punches through a blank record, means including a series of feed rollers for feeding a control record and a blank record through the machine in steps of index point interevals, and connections between said brushes and said magnets whereby said magnets are energized in accordance with data recorded in said control records.

34. In perforating apparatus including a plurality of punches and dies therefor, means for causing the actuation of one or more punches, said means including an interposer for each punch, and an electro-magnet for each interposer for moving and holding the latter into operative relation to its punch only during the time said magnet is energized.

35. A device according to claim 34 in which a sensing means including brushes is provided through which control records may be fed synchronously with the feeding of records to the punches and connections between said brushes and said electro-magnets whereby an impulse instituted by a control record will cause said electro-magnet to hold an interposer in operative relation to its punch only during the life of the impulse instituted by said control record.

CLAIR D. LAKE.